(12) United States Patent
Joshi

(10) Patent No.: US 10,146,943 B2
(45) Date of Patent: Dec. 4, 2018

(54) SYSTEM AND METHOD TO DISABLE THE ERASURE OF AN ADMINISTRATOR PASSWORD IN AN INFORMATION HANDLING SYSTEM

(71) Applicant: Dell Products, LP, Round Rock, TX (US)

(72) Inventor: Anand P. Joshi, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 9 days.

(21) Appl. No.: 14/851,741

(22) Filed: Sep. 11, 2015

(65) Prior Publication Data
US 2017/0076088 A1    Mar. 16, 2017

(51) Int. Cl.
*G06F 21/57* (2013.01)

(52) U.S. Cl.
CPC .................................. *G06F 21/572* (2013.01)

(58) Field of Classification Search
CPC ........ G06F 21/45; G06F 21/57; G06F 21/572; G06F 21/60; G06F 21/70; G06F 21/31; G06F 2221/2131; G06F 1/24; G06F 9/4401
See application file for complete search history.

(56) References Cited

U.S. PATENT DOCUMENTS

| | | | | |
|---|---|---|---|---|
| 5,485,622 A | * | 1/1996 | Yamaki | G06F 21/31 710/200 |
| 8,065,509 B2 | | 11/2011 | Wang et al. | |
| 2007/0162733 A1 | | 7/2007 | Dennis et al. | |
| 2011/0126023 A1 | | 5/2011 | Wang et al. | |
| 2013/0151838 A1 | * | 6/2013 | Chen | G06F 1/24 713/100 |
| 2013/0185789 A1 | * | 7/2013 | Hagiwara | G06F 21/45 726/18 |
| 2015/0242630 A1 | | 8/2015 | Barkelew et al. | |

\* cited by examiner

*Primary Examiner* — Joseph P Hirl
*Assistant Examiner* — Chi D Nguy
(74) *Attorney, Agent, or Firm* — Larson Newman, LLP

(57) ABSTRACT

An information handling system includes a bypass jumper and a processor that executes a firmware interface. The firmware interface includes a protected setting for a device of the information handling system, wherein, when the bypass jumper is in a first jumper state, the protected setting is accessed in response to the firmware interface receiving a user password that matches an administrator password, and wherein the administrator password is stored in a memory of the information handling system, a password bypass module that bypasses authenticating the password and grants access to the protected setting when the bypass jumper is in a second jumper state, and a password management module that, based upon a password erase input, erases the administrator password from the memory when the bypass jumper is in the second state.

15 Claims, 3 Drawing Sheets

SYSTEM AND METHOD TO DISABLE THE ERASURE OF AN ADMINISTRATOR PASSWORD IN AN INFORMATION HANDLING SYSTEM

FIELD OF THE DISCLOSURE

This disclosure generally relates to information handling systems, and more particularly relates to a system and method to disable the erasure of an administrator password in an information handling system.

BACKGROUND

As the value and use of information continues to increase, individuals and businesses seek additional ways to process, store, and communicate information. One option is an information handling system. Information handling systems generally process, compile, store, and/or communicate information or data for business, personal, or other purposes. Because technology and information handling needs and requirements vary between different applications, information handling systems may also vary regarding what information is handled, how the information is processed, stored, or communicated, and how quickly and efficiently the information may be processed, stored, or communicated. The variations in information handling systems allow information handling systems to be general purpose systems or to be configured for specific uses or users, such as for financial transaction or reservation processing, for enterprise data storage, for global communications, or for other specific uses or users. In addition, information handling systems may include a variety of hardware and software resources that may be configured to process, store, and communicate information and may include one or more computer systems, data storage systems, and networking systems.

An information handling systems can include a firmware layer that operates to initialize and test the functions, features and hardware of the information handling system, to load a boot loader or an operating system from a storage device, and to provide an abstraction layer for the functions, features, and hardware of the information handling system. For example, an information handling system can include a Basic Input/Output System (BIOS), a Unified Extensible Firmware Interface (UEFI), or the like. The firmware layer can include hardware and software configuration settings that affect the operation of the information handling system. In order to protect an information handling system from having the hardware and software configuration settings misconfigured, or from malicious manipulation of the hardware and software configuration settings, the hardware and software configuration settings can be protected by an administrator password.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
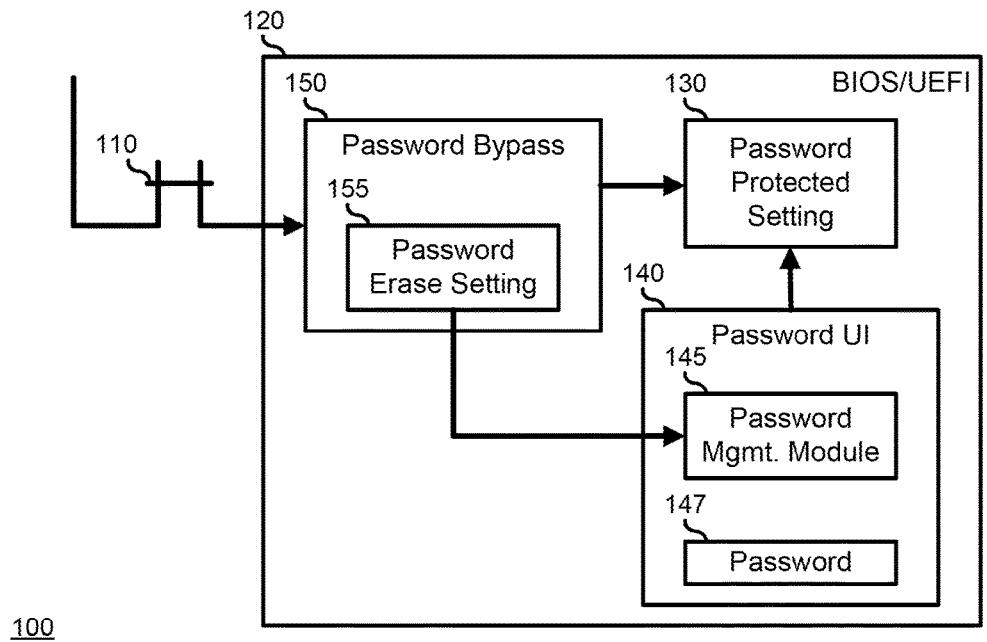
FIG. 1 is a block diagram illustrating an information handling system according to an embodiment of the present disclosure.

FIG. 1 illustrates an embodiment of an information handling system 100. For the purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes an administrator password bypass jumper 110 and a BIOS/UEFI 120. Administrator password bypass jumper 110 operates to provide a user selectable hardware input signal on information handling system 100, as described further below. BIOS/UEFI 120 represents a firmware layer that operates to initialize and test the functions, features, and hardware of information handling system 100, to load a boot loader or an operating system from a storage device, and to provide an abstraction layer for the functions, features, and hardware of the information handling system.

BIOS/UEFI 120 includes one or more administrator password protected setting 130, an administrator password user interface (UI) 140, and an administrator password bypass module 150. Administrator password protected setting 130 represent hardware and software configuration settings of information handling system 100 that are protected by an administrator password 147. An example of administrator password protected setting 130 can include typical BIOS/UEFI settings such as boot order selections, boot loader identification, system date and time settings, system time base and clock frequency settings, CPU and interface frequency settings, system voltage settings, power management settings, other BIOS/UEFI settings, and other platform specific settings as needed or desired. Administrator password UI 140 includes an administrator password management module 145 and administrator password 147. Administrator password UI 140 operates to provide an administrator password query display to a user of information handling system 100, and, when an administrator password entered in the administrator password query display by the user matches administrator password 147, to grant the user access to administrator password protected setting 130. In a particular embodiment, administrator password 147 includes a username and an administrator password, and the administrator password query display prompts the user to enter both the user name and the administrator password. In this embodiment, administrator password protected setting 130 represents different levels of setting security where different users are granted access to different administrator password protected settings.

Administrator password management module 145 operates to implement and manage administrator password 147. In particular, administrator password 147 is stored in a non-volatile memory of information handling system 100, such as a Flash NVRAM, a battery backed-up EEPROM, or the like, as needed or desired, and administrator password management module 145 operates to perform read, write, modify, and erase operations on the non-volatile memory. Here, when information handling system 100 is being configured, administrator password management module 145 operates to write an administrator password 147 to the non-volatile memory of information handling system 100. For example, when information handling system 100 is first powered, administrator password UI 145 can prompt a user to enter a new administrator password, and administrator password management module 140 can set the new administrator password as administrator password 147 by writing the new administrator password to the non-volatile memory. In subsequent operations, administrator password 147 can be read from the non-volatile memory and compared with a user provided administrator password to validate the user's access to administrator password protected setting 130. In other operations, administrator password 147 can be changed. Here, a user can provide an indication that administrator password 147 is to be changed, administrator password UI 145 can prompt the user to enter a changed administrator password, and administrator password management module 140 can set the changed administrator password as administrator password 147 by erasing the old administrator password, and by writing the changed administrator password to the non-volatile memory of information handling system 100.

Administrator password bypass module 150 includes an administrator password erase setting 155. When enabled, administrator password bypass module 150 operates to bypass administrator password UI 140 and grant a user access to administrator password protected setting 130 to the user of information handling system 100. Administrator password bypass module 150 is enabled when administrator password bypass jumper 110 is removed. As such, administrator password bypass jumper 110 ensures that a user has physical access to information handling system 100 in order to bypass administrator password UI 140. The skilled artisan will recognize that administrator password bypass jumper 110 can represent an input signal to information handling system 100 that represents a normal operating mode when administrator password bypass jumper 110 is installed, and a bypass operating mode when the jumper is removed, or can similarly represent the normal operating mode when the jumper is removed, and the bypass operating mode when the jumper is installed. Moreover, the skilled artisan will recognize that the input signal to information handling system 100 can represent a logic high input signal when administrator password bypass jumper 110 is installed, or can represent a logic low input signal when the jumper is installed.

Administrator password erasure setting 155 represents a configuration settings of information handling system 100 that, when enabled, operates to direct administrator password management module 145 to erase administrator password 147 when administrator password bypass module 150 is enabled. When administrator password erasure setting 155 is disabled, administrator password management module 145 is not directed to erase administrator password 147, but the administrator password is retained after administrator password bypass module 150 is disabled (i.e., when administrator password bypass jumper 110 is reinstalled). The skilled artisan will recognize that administrator password erasure setting 155 can be enabled by storing a particular logical value in a non-volatile memory location of information handling system 100, and that the logical value for enabling and disabling the administrator password erasure setting can be determined as needed or desired. For example, a logic "1" can enable administrator password erasure setting 155 and a logic "0" can disable the administrator password erasure setting, or the logical values can be reversed, as needed or desired. In a particular embodiment, administrator password erasure setting 155 is included in administrator password protected setting 130.

After the user is finished accessing administrator password protected setting 130, the user can reinstall administrator password bypass jumper 110 and re-boot information handling system into the normal operating mode. Then, if administrator password 147 was not erased, information handling system 100 will reboot normally with administrator password protected setting 130 protected by the operation of administrator password UI 140. On the other hand, if administrator password 147 was erased, then, when information handling system 100 is rebooted, administrator password UI 140 prompts the user to enter a new administrator password, and administrator password management module 145 sets the new administrator password as administrator password 147 by writing the new administrator password to the non-volatile memory.

Figure 2:
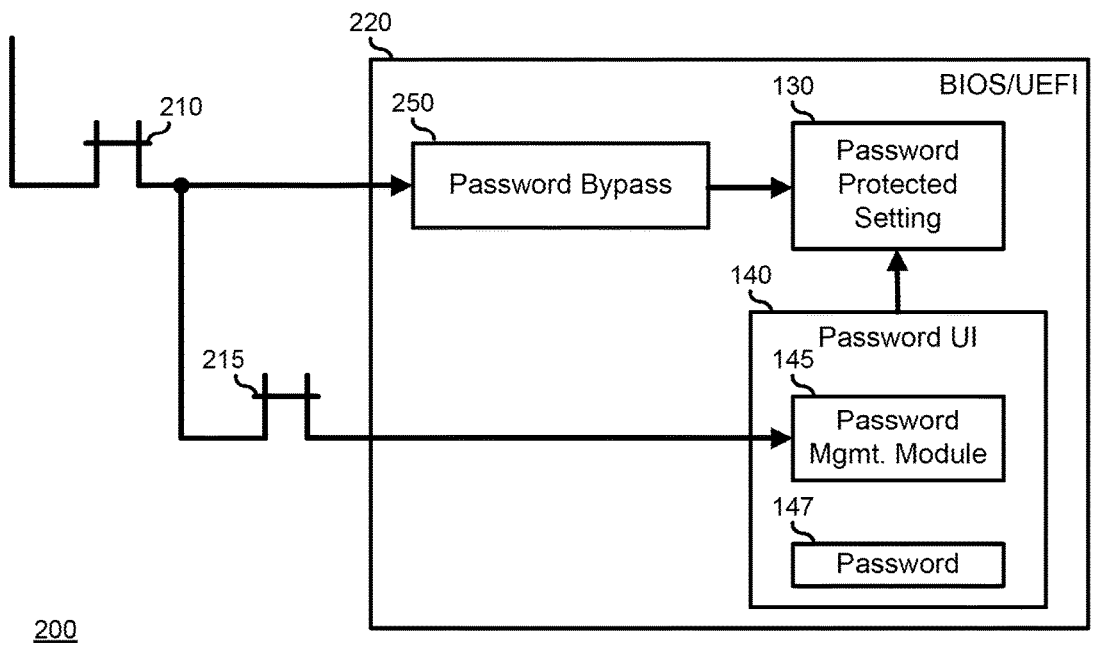
FIG. 2 is a block diagram illustrating an information handling system according to another embodiment of the present disclosure.

FIG. 2 illustrates an embodiment of an information handling system 200, including an administrator password bypass jumper 210, an administrator password erase jumper 215, and a BIOS/UEFI 220. BIOS/UEFI 220 includes administrator password protected setting 130, administrator password UI 140, and an administrator password bypass module 250. Administrator password UI 140 includes administrator password management module 145 and administrator password 147. Information handling system 200 operates similarly to information handling system 100, except that in information handling system 200 the functions and features of administrator password erasure setting 155 are replaced by administrator password erase jumper 215. As such, when administrator password bypass jumper 210 is removed, administrator password bypass module 250 is enabled to bypass administrator password UI and permit access to administrator password protected setting 130. Here, when administrator password erase jumper 215 is removed, administrator password management module 145 is configured to erasure administrator password 147.

Figure 3:
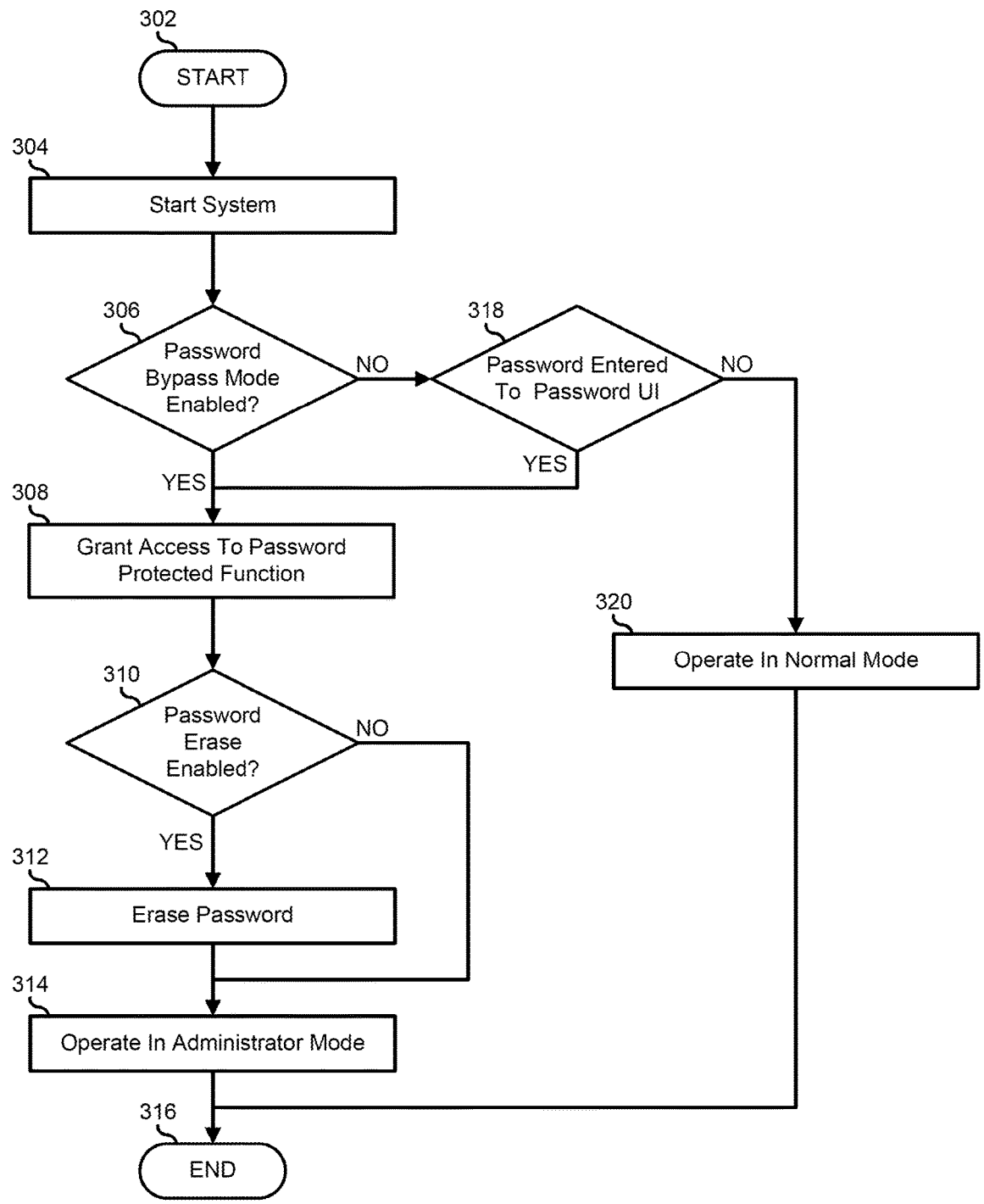
FIG. 3 is a flowchart illustrating a method to disable the erasure of an administrator password in an information handling system according to an embodiment of the present disclosure.

FIG. 3 illustrates a method to disable the erasure of an administrator password in an information handling system, starting at block 302. An information handling system is started in block 304. For example, information handling system 100 can be booted. A decision is made as to whether or not an administrator password bypass mode is enabled in decision block 306. For example, administrator password bypass jumper 110 can be removed or installed to enable the administrator password bypass mode, as needed or desired. If the administrator password bypass mode is enabled, the "YES" branch of decision block 306 is taken and a user of the information handling system is granted access to one or more administrator password protected function in block 308. For example, a user of information handling system 100 can be granted access to administrator password protected setting 130.

A decision is made as to whether or not an administrator password erasure mode is enabled in decision block 310. For example, in a first embodiment, administrator password erasure setting 155 can be set, to direct administrator password management module 145 to erase administrator password 147. In another embodiment, administrator password erase jumper 215 can be removed or installed to enable the administrator password erasure mode, as needed or desired. If the administrator password erasure mode is enabled, the "YES" branch of decision block 310 is taken, the administrator password is erased in block 312, the information handling system is operated in an administrator mode in block 314, and the method ends in block 316. If the administrator password erasure mode is not enabled, the "NO" branch of decision block 310 is taken, the information handling system is operated in the administrator mode in block 314, and the method ends in block 316.

Returning to decision block 306, if the administrator password bypass jumper is not enabled, the "NO" branch of decision block 306 is taken and a decision is made as to whether or not an administrator password has been entered into a password UI in decision block 318. For example, administrator password UI 140 can provide an administrator password query display to a user of information handling system 100, and the user can enter an administrator password that matches administrator password 147. If the administrator password has been entered into the password UI, the "YES" branch of decision block 318 is taken and the method proceeds to block 308 where the user of the information handling system is granted access to one or more administrator password protected function. If the administrator password has not been entered into the password UI, the "NO" branch of decision block 318 is taken, the information handling system is operated in a normal mode in block 320, and the method ends in block 316.

Figure 4:
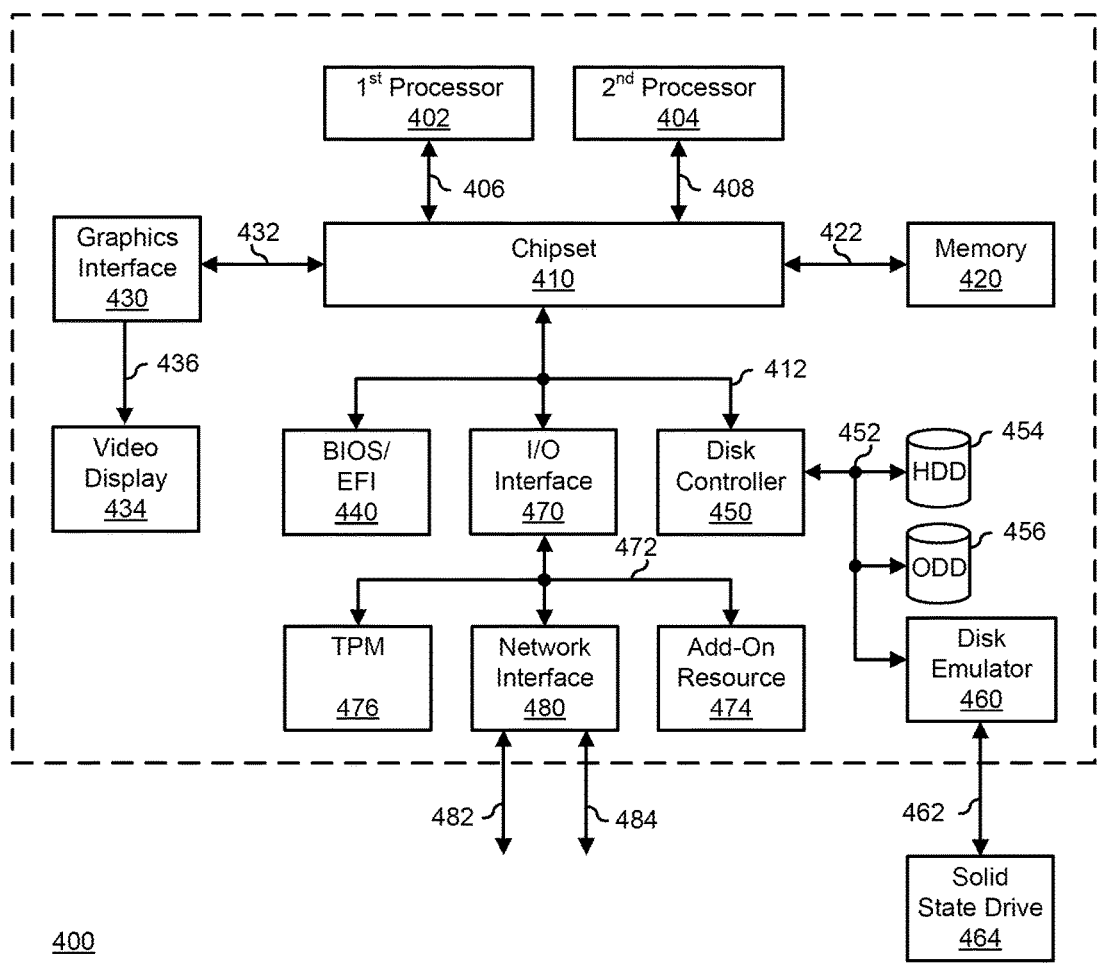
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a bypass jumper; and
a processor that executes a firmware interface, the firmware interface comprising:
a protected setting for a device of the information handling system, wherein when the bypass jumper is in a first jumper state, the protected setting is accessed in response to the firmware interface receiving a user password that matches an administrator password, and wherein the administrator password is stored in a memory of the information handling system;
a password bypass module that bypasses authenticating the password and grants access to the protected setting when the bypass jumper is in a second jumper state, the password bypass module including an output that provides an output signal in one of a first state and a second state; and
a password management module that includes an input to receive the output signal when the bypass jumper is in the second state, the password management module determines whether or not to erase the administrator password from the memory based upon whether the output signal is in the first or the second state.

2. The information handling system of claim 1, wherein the password management module erases the administrator password from the memory when the output signal is in the first state.

3. The information handling system of claim 2, wherein the password management module does not erase the administrator password from the memory when the output signal is in the second state.

4. The information handling system of claim 1, wherein the firmware interface comprises a Basic Input/Output System (BIOS).

5. The information handling system of claim 1, wherein the firmware interface comprises a Unified Extensible Firmware Interface (UEFI).

6. A method, comprising:
protecting a protected setting for a device of an information handling system when a password bypass input is in a first input state, wherein the protected setting is protected by an administrator password stored in a memory of the information handling system, and wherein the password bypass input is received from a password bypass jumper of the information handling system;
granting, by a password bypass module, access to the protected setting when the password bypass input is in a second input state;
generating, by the password bypass module, an output signal in one of a first state and a second state; and
when the password bypass input is in the second input state, determining whether or not to erase the administrator password from the memory based upon whether the output signal is in the first or the second state.

7. The method of claim 6, further comprising:
erasing the administrator password from the memory when the output signal is in the first state.

8. The method of claim 7, further comprising:
retaining the administrator password in the memory when the output signal is in the second state.

9. The method of claim 6, wherein a password erase input setting provides the output signal.

10. The method of claim 9, wherein the protected setting comprises the output signal.

11. A non-transitory computer-readable medium including code for performing a method, the method comprising:
protecting a protected setting for a device of an information handling system when a password bypass input is in a first input state, wherein the protected setting is protected by an administrator password stored in a memory of the information handling system, and wherein the password bypass input is received from a password bypass jumper of the information handling system;
granting access to the protected setting when the password bypass input is in a second input state;
generating an output signal in one of a first state and a second state; and
when the password bypass input is in the second input state, determining whether or not to erase the administrator password from the memory based upon whether the output signal is in the first or the second state.

12. The computer-readable medium of claim 11, the method further comprising:
erasing the administrator password from the memory when the output signal is in the first state.

13. The computer-readable medium of claim 12, the method further comprising:
retaining the administrator password in the memory when the output signal is in the second input state.

14. The computer-readable medium of claim 11, wherein a password erase input setting provides the output signal.

15. The computer-readable medium of claim 14, wherein the protected setting comprises the output signal.

* * * * *